(12) United States Patent
Yang et al.

(10) Patent No.: US 8,872,477 B2
(45) Date of Patent: Oct. 28, 2014

(54) BATTERY PACK AND LINE OPEN DETECTING METHOD THEREOF

(75) Inventors: Jongwoon Yang, Yongin-si (KR); Euijeong Hwang, Yongin-si (KR); Susumu Segawa, Yongin-si (KR); Jinwan Kim, Yongin-si (KR); Hanseok Yun, Yongin-si (KR); Beomgyu Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 527 days.

(21) Appl. No.: 12/972,227

(22) Filed: Dec. 17, 2010

(65) Prior Publication Data

US 2011/0156650 A1 Jun. 30, 2011

(30) Foreign Application Priority Data

Dec. 28, 2009 (KR) ........................ 10-2009-0131611

(51) Int. Cl.
H02J 7/00 (2006.01)

(52) U.S. Cl.
CPC ............. *H02J 7/0026* (2013.01); *H02J 7/0029* (2013.01); *H02J 7/0014* (2013.01)
USPC ............ 320/118; 320/116; 320/124; 324/426

(58) Field of Classification Search
CPC ...................................................... H02J 7/0026
USPC ......... 320/118, 116, 124, 127, 136, 134, 103, 320/104, 106; 324/426
See application file for complete search history.

(56) References Cited

U.S. PATENT DOCUMENTS

| | | | | |
|---|---|---|---|---|
| 6,127,808 A * | 10/2000 | Sudo et al. | ..................... | 320/134 |
| 6,208,117 B1 * | 3/2001 | Hibi | ............... | 320/134 |
| 6,246,214 B1 * | 6/2001 | Oglesbee | ..................... | 320/136 |
| 7,276,881 B2 * | 10/2007 | Okumura et al. | ............. | 320/134 |
| 7,649,340 B2 * | 1/2010 | Sato et al. | ..................... | 320/134 |
| 2004/0041569 A1 | 3/2004 | Furukawa | | |
| 2006/0139008 A1 | 6/2006 | Park | | |
| 2007/0108940 A1 | 5/2007 | Sainomoto et al. | | |
| 2008/0116851 A1 * | 5/2008 | Mori | ............................. | 320/134 |
| 2009/0051324 A1 * | 2/2009 | Nakatsuji | ..................... | 320/134 |

FOREIGN PATENT DOCUMENTS

| | | |
|---|---|---|
| EP | 1 798 833 A1 | 6/2007 |
| JP | 09-117072 (A) | 5/1997 |
| JP | 10-150721 (A) | 6/1998 |
| JP | 2003-132873 (A) | 5/2003 |
| JP | 2005-235472 (A) | 9/2005 |
| JP | 2005-300195 (A) | 10/2005 |
| JP | 2007-143284 (A) | 6/2007 |
| JP | 2007-240234 (A) | 9/2007 |
| JP | 2009-103706 A | 5/2009 |
| KR | 10-2004-0004615 (A) | 1/2004 |
| KR | 10-2006-0059680 A | 6/2006 |
| KR | 10-2009-0010052 A | 1/2009 |
| KR | 10-2009-0010052 (A) | 1/2009 |
| WO | WO 2007/119682 A1 | 10/2007 |

OTHER PUBLICATIONS

Korean Office Action dated Mar. 24, 2011 for Korean Patent Application No. KR 10-2009-0131611 which corresponds to the captioned Application.
Extended European Search Report dated May 16, 2011 for European Application No. EP 10 19 6595 corresponding to Korean Patent Application No. KR 10-2009-0131611 which corresponds to captioned U.S. Appl. No. 12/972,227.
Japanese Office Action dated Aug. 21, 2012 for Japanese Patent Application No. JP 2010-255685 which shares priority of Korean Patent Application No. KR 10-2009-0131611 with captioned U.S. Appl. No. 12/972,227.
Korean Notice of Allowance dated Nov. 29, 2011 for Korean Patent Application No. KR 10-2009-0131611 which corresponds to captioned U.S. Appl. No. 12/972,227.
Chinese Office Action dated Mar. 8, 2013 for Chinese Patent Application No. 201010607043.8 which shares priority of Korean Patent Application No. KR 10-2009-0131611 with captioned U.S. Appl. No. 12/972,227.

* cited by examiner

*Primary Examiner* — Yalkew Fantu
(74) *Attorney, Agent, or Firm* — Knobbe, Martens, Olson & Bear LLP

(57) ABSTRACT

A battery pack and a method of operating the battery pack are disclosed. The battery pack includes a plurality of battery cells and is configured to open a terminal of the battery if an open circuit is detected in a line connecting battery cells.

14 Claims, 4 Drawing Sheets

BATTERY PACK AND LINE OPEN DETECTING METHOD THEREOF

CROSS-REFERENCE TO RELATED APPLICATION

Korean Patent Application No. 10-2009-0131611, filed on Dec. 28, 2009, in the Korean Intellectual Property Office, and entitled: "a battery pack and a line open detecting method thereof" is incorporated by reference herein in its entirety.

BACKGROUND

1. Field

Embodiments relate to a battery pack and a method of sensing a line open condition thereof.

2. Description of the Related Technology

Generally, portable electric devices such as portable notebook computers and portable power tools may have a rechargeable battery pack. This battery pack includes a plurality of battery cells and a controller for controlling overcharge and over-discharge of each battery cell and for calculating its capacity.

In addition, battery packs equipped in certain devices such as portable power tools do not include an over-discharge controller. For example, some portable power tool manufacturers do not install an over-discharge controller into the battery pack in order to increase the maximum power output thereof. Accordingly, reliability of the battery packs mounted in such devices suffers.

SUMMARY OF CERTAIN INVENTIVE ASPECTS

One aspect is a battery pack. The battery pack includes a battery having a plurality of battery cells, a plurality of connection lines connected between the plurality of battery cells, a control unit configured to control a charging and discharging operation of the battery, and a protection circuit unit connected to the battery and to the control unit, where the control unit is configured to open the protection circuit unit when a line open condition in a connection line is detected.

Another aspect is a method of operating a battery pack. The method includes determining, with a control unit, that a line open check is to be performed for a plurality of connection lines connected between a plurality of battery cells in a battery. If the line open check is to be performed, with the control unit, determining whether a line open condition in the plurality of connection lines exists, and if a line open condition in the plurality of connection lines exists, in response to a signal from the control unit, opening a protection circuit unit connected to the battery.

BRIEF DESCRIPTION OF THE DRAWINGS

The above and other features and advantages will become more apparent to those of ordinary skill in the art through the discussion of certain exemplary embodiments which reference the attached drawings, in which.

DETAILED DESCRIPTION OF CERTAIN INVENTIVE EMBODIMENTS

Hereinafter, inventive aspects of various embodiments will be described in detail with reference to the accompanying drawings.

Figure 1:
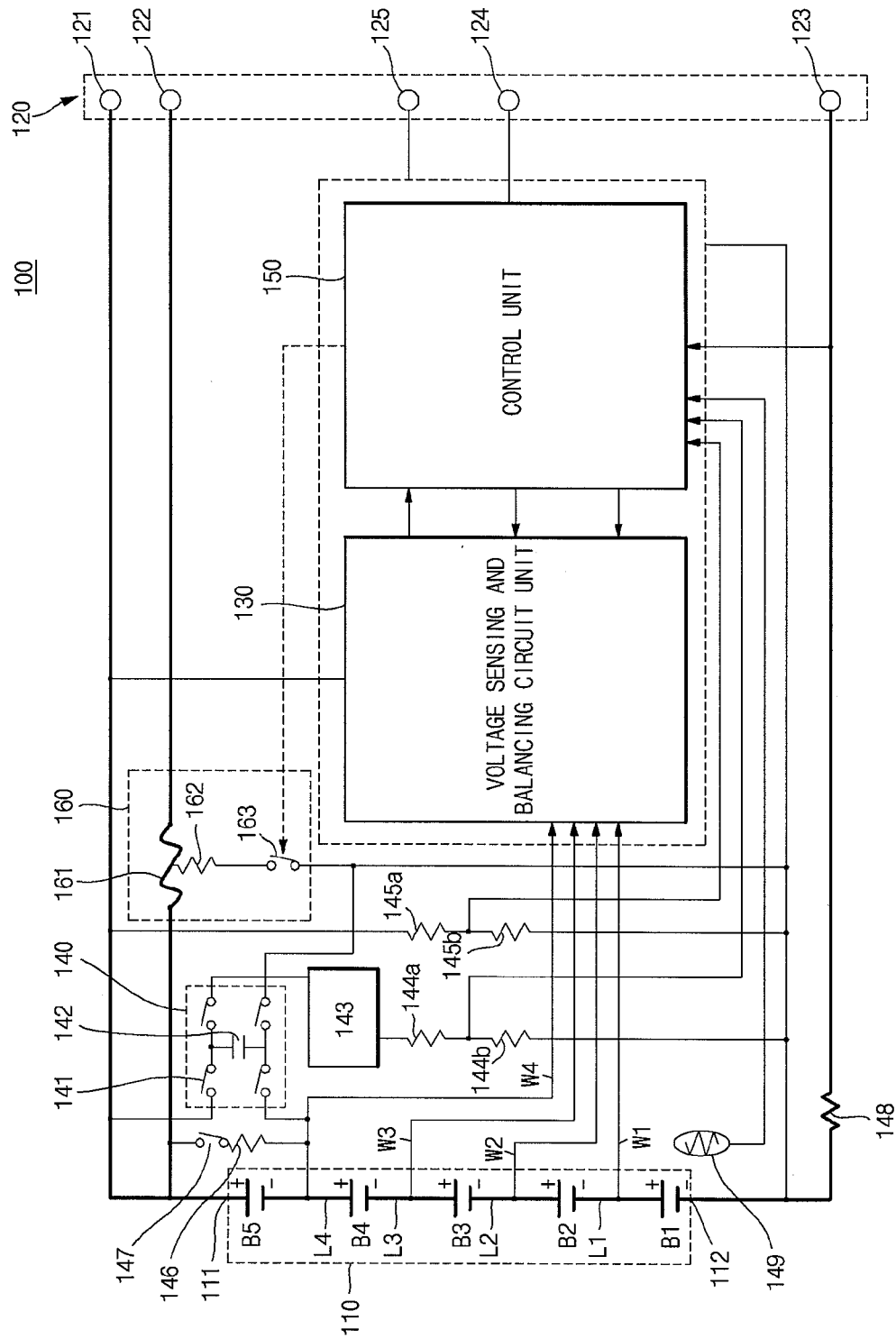
FIG. 1 is a block diagram illustrating a configuration of a battery pack according to some embodiments.

FIG. 1 is a block diagram illustrating a configuration of a battery pack according to some embodiments.

Referring to FIG. 1, a battery pack 100 according to one embodiment of the present invention includes a battery 110, an external terminal unit 120, a voltage sensing and balancing circuit unit 130, an analog switch unit 140, a control unit 150, and a protection circuit unit 160.

The battery 110 may include a plurality of battery cells B1, B2, B3, B4, and B5 and each of the battery cells B1, B2, B3, B4, and B5 may be a lithium ion battery that can be charged up to about 4.2 V, but the invention is not limited thereto. Here, each of the battery cells B1, B2, B3, B4, and B5 has a positive terminal (+) and a negative terminal (−) and may be connected to each other in parallel or in series using the plurality of connection lines L1, L2, L3, and L4.

The battery cells B1, B2, B3, B4, and B5 include a first battery cell B1, a second battery cell B2, a third battery cell B3, a fourth battery cell B4, and a fifth battery cell B5. In this embodiment, the number of the battery cells B1, B2, B3, B4, and B5 is five, but the invention is not limited thereto. Additionally, the connection lines L1, L2, L3, and L4 may include a first connection line L1, a second connection line L2, a third connection line L3, and a fourth connection line L4. The connection lines L1, L2, L3, and L4 may be configured with a conductive tap comprising a material such as nickel, and its number may vary according to the number of battery cells.

The external terminal unit 120 may electrically connect the battery pack 100 with an external electronic device such as charging equipment or a load. For this, the external terminal unit 120 may include a pack discharging terminal 121 for discharging the battery 110, a pack charging terminal 122 for charging the battery 110, a pack negative terminal 123 for discharging or charging the battery 110, a communication terminal 124 for communication between the battery 110 and an external electronic device, and a power terminal 125 for supplying power to the control unit 150. The pack discharging terminal 121 is connected to a positive terminal 111 of the battery 110, and the pack charging terminal 122 is connected to the positive terminal 111 of the battery 110. The pack negative terminal 123 is connected to a negative terminal 112 of the battery 110. The communication terminal 124 and the power terminal 125 are connected to the control unit 150. As shown, the external terminal unit 120 includes the pack discharging terminal 121 and the pack charging terminal 122 such that a discharging path and a charging path of the battery pack 100 are separated. Battery pack 100 including the terminal unit 120 may be applied to a power tool pack, but the invention is not limited thereto.

The voltage sensing and balancing circuit unit 130 is connected to the positive terminals of battery cells B1, B2, B3, and B4 through sensing wires W1, W2, W3, and W4, respectively. in order to sense voltages of the battery cells B1, B2, B3, and B4. The voltage sensing and balancing circuit unit 130 supplies the voltages of the battery cells B1, B2, B3, and B4 to the control unit 150. The voltage sensing and balancing circuit unit 130 may include various kinds of analog front ends manufactured for a lithium ion battery, but the invention is not limited thereto.

The analog switching unit 140 is connected to the positive terminal (+) and the negative terminal (−) of the fifth battery cell B5 in order to sense a voltage of the fifth battery B5. The analog switching unit 140 may include a plurality of switches 141 and a flying capacitor 142 for charging a voltage of the fifth battery cell B5. The analog switching unit 140 supplies a voltage of the fifth battery cell B5, charged in the flying capacitor 142, to the control unit 150, by turning on and off the switches 141 in response to a control signal of the control unit 150. An operational amplifier (op-amp) 143 and voltage-dividing resistors 144a and 144b are further connected between the analog switching unit 140 and the control unit 150. Additionally, voltage-dividing resistors 145a and 145b are connected between the pack discharging terminal 121 and the negative terminal 112 of the battery 110, and the voltage-dividing resistors 145a and 145b supply a voltage of the entire battery pack 100 to the control unit 150. In alternative embodiments, the dividing resistors 145a and 145b are connected to the pack negative terminal 123 instead of the negative terminal 112 of the battery 110.

A balancing resistor 146 and a balancing switch 147 for balancing the fifth battery cell B5 are connected between the positive terminal(+) and the negative terminal(−) of the fifth battery cell B5. Here, the balancing switch 147 may be turned on or off in response to a control signal of the control unit 150. Although not illustrated in the drawing, balancing resistors and balancing switches for the battery cells B1, B2, B3, and B4 may be included, for example, in the voltage sensing and balancing circuit unit 130. Moreover, in this embodiment a current sensor resistor 148 for sensing a current of the battery pack 100 may be connected between the negative terminal 112 of the battery 110 and the pack negative terminal 123, and a temperature sensor 149 for sensing a temperature of the battery 110 may be connected to the control unit 150.

The control unit 150 generates a charge/discharge control signal and a balancing control signal corresponding to information about one or more voltages of the battery 110, which are provided from the voltage sensing and balancing circuit unit 130, the analog switching unit 140, and the dividing resistors 145a and 145b. Furthermore, the control unit 150 provides the charge/discharge control signal and the balancing control signal to the voltage sensing and balancing circuit unit 130 to control charging and discharging operation of the battery 110.

If the control unit 150 detects a line open condition of the plurality of connection lines L1, L2, L3, and L4 between the plurality of battery cells B1, B2, B3, B4, and B5, it opens the protection circuit unit 160 to stop charging and discharging operation of the battery 110.

Specifically, if the control unit 150 receives a line open check signal or determines that a current of the battery 110 is less than a reference current value for a predetermined time, suggesting that the battery 110 has an open circuit, the control unit 150 starts to determine if a line open condition exists in the plurality of connection lines L1, L2, L3, and L4 between the plurality of battery cells B1, B2, B3, B4, and B5. The line open check signal may be provided from an operator through the communication terminal 124 before the shipment of the battery pack 100, and may be a command signal for checking a line open condition of the plurality of connection lines L1, L2, L3, and L4 between the plurality of batteries B1, B2, B3, B4, and B5. Also, if a current of the battery 110 is less than a reference current value for a predetermined time, it suggests that there is almost no voltage variation of the battery 100 after the shipment of the battery pack 100. That is, the battery pack 100 is in an unchanging state where there is almost no charging and discharging operation of the battery 110. Here, a current of the battery 110 may be sensed by the current sensor resistor 148. In some embodiments, the predetermined time may be about 1 minute and the reference current value may be about 500 mA, but the invention is not limited thereto.

If the control unit 150 receives a line open check signal or determines that a current of the battery 110 is less than a reference current value for a predetermined time, the control unit 150 determines whether a difference between the maximum value Vmax and the minimum value Vmin of voltages V1, V2, V3, and V4, and V5 of the plurality of battery cells B1, B2, B3, B4, and B5 is greater than the reference voltage value. V1 refers to a voltage across the first battery cell B1. V2 refers to a voltage across the second battery cell B2. V3 refers to a voltage across the third battery cell B3. V4 refers to a voltage across the fourth battery cell B4. V5 refers to a voltage across the fifth battery cell B5. The control unit 150 determines that there is a line open condition in the plurality of connection lines L1, L2, L3, and L4 between the plurality of batteries B1, B2, B3, B4, and B5 if a difference between the maximum value Vmax and the minimum value Vmin is greater than the reference voltage value. Then, the control unit 150 sends a signal to blow a fuse 161 of the protection circuit unit 160, in order to stop a charging operation of the battery unit 110. Here, the reference voltage value may be about 1 V, but the invention is not limited thereto. In addition, the control unit 150 and the voltage sensing and balancing circuit unit 130 may be integrated into one integrated circuit, which can be manufactured on one single semiconductor chip.

The protection circuit unit 160 is connected to the battery 110, the control unit 150, and the pack charging terminal 122, and operates in response to a signal from the control unit 150. The protection circuit unit 160 is opened in response to the signal from the control unit 150 to prevent the over-charging of the battery 110 when a voltage of the battery 110 is more than an over-charge critical voltage. Additionally, if the control unit 150 determines that there is a line open of the plurality of connection lines L1, L2, L3, and L4 between the plurality of battery cells B1, B2, B3, B4, and B5, the protection circuit unit 160 is opened by the control unit 150 to stop the charging and discharging operation of the battery 110. For this, the protection circuit unit 160 includes a fuse 161, a heat resistor 162, and a control switch 163.

The fuse 161 is connected between the positive terminal 111 of the battery 110 and the pack charging terminal 122. The heat resistor 162 is connected between the fuse 161 and the control unit 150. The control switch 163 is connected to the heat resistor 162 and to the control unit 150. The protection circuit unit 160 is opened when the fuse 161 is blown. The blowing of the fuse 161 occurs as a result of a large amount of heat occurs in the heat resistor 162. The temperature of the heat resistor 162 rises when the control switch 163 is turned on by the control unit 150 and then current flows from the pack charging terminal 122 or the positive terminal 111 of the battery 110 to the negative terminal 112 of the battery 110 through the fuse 161, the heat resistor 162, and the control switch 163.

Since the battery pack 100 includes the control unit 150, it may detect a line open condition in the plurality of connection lines L1, L2, L3, and L4 between the plurality of battery cells B1, B2, B3, B4, and B5. The battery pack 100 may reduce defects before shipment. Additionally, the battery pack 100 stops an charging and discharging operation of the battery 110 when there is a line open condition in the plurality of connection lines L1, L2, L3, and L4 between the plurality of battery cells B1, B2, B3, B4, and B5 after shipment. Therefore, its quality and reliability is improved.

A method of detecting a line open condition in the battery pack 100 is described.

Figure 2:
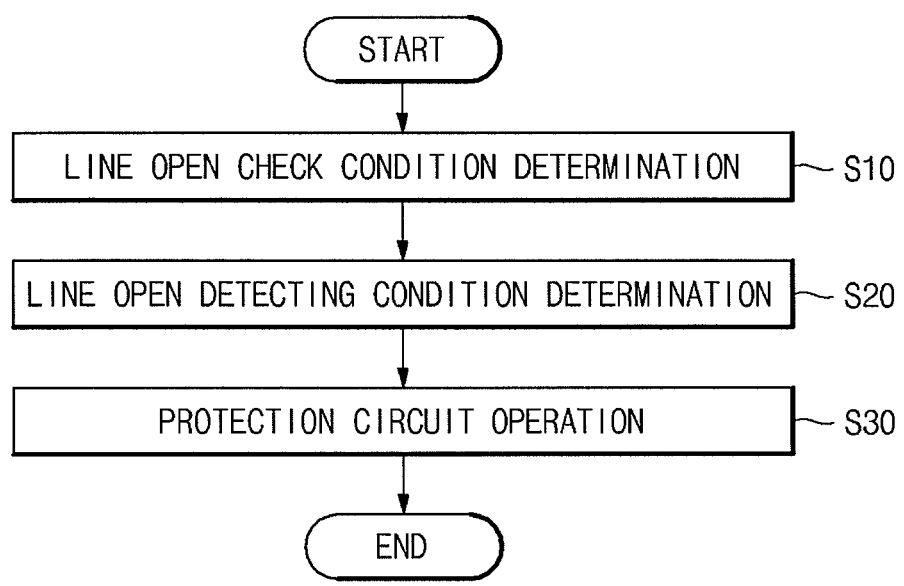
FIG. 2 is a flowchart illustrating a method of detecting a line open condition in a battery pack according to some embodiments.
Figure 3:
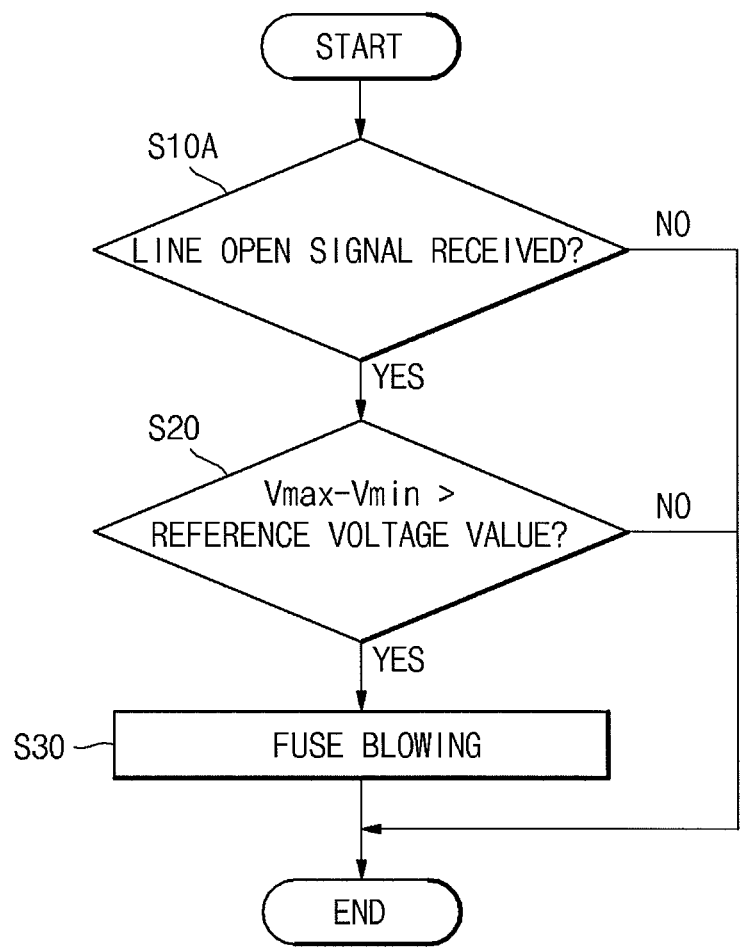
FIG. 3 is a flowchart illustrating a method of detecting a line open condition in a battery pack according to some embodiments.
Figure 4:
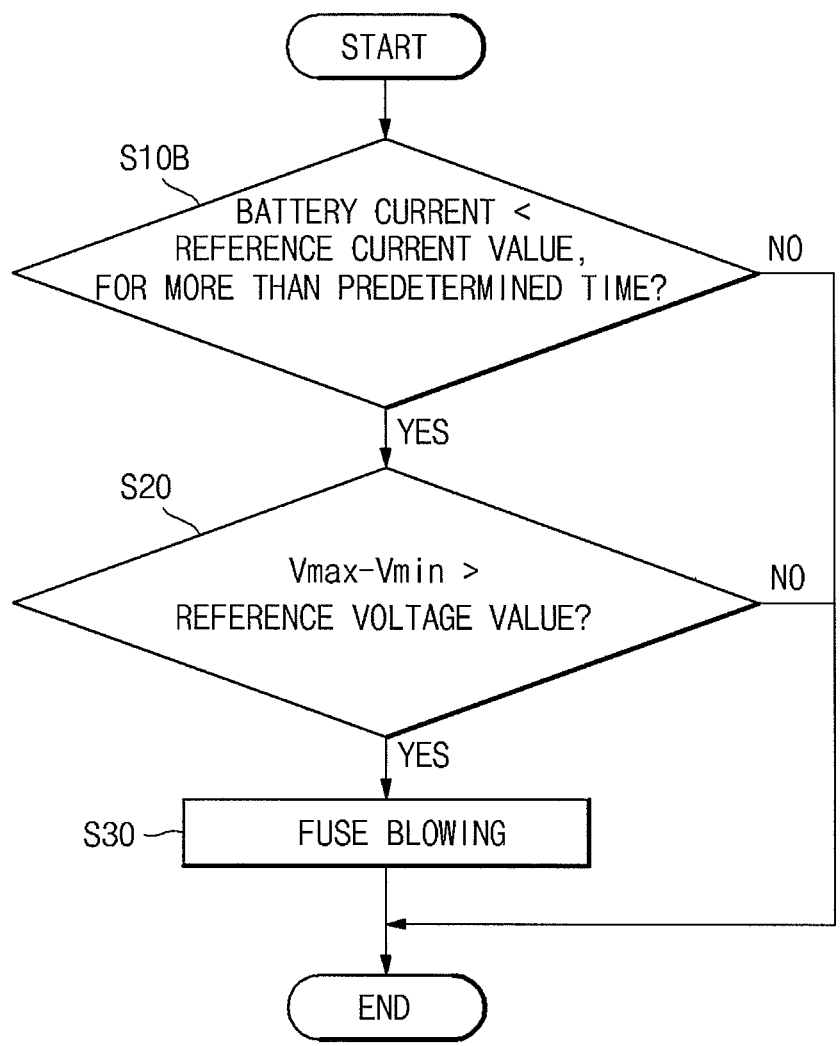
FIG. 4 is a flowchart illustrating a method of detecting a line open condition in a battery pack according to some embodiments.

FIGS. 2, 3 and 4 are flowcharts illustrating methods of detecting a line open condition in a battery pack according to some embodiments.

Referring to FIGS. 2 to 4, the line open detecting method of the battery pack 100 includes determining a state to check for a line open condition in operation S10, determining whether a line open condition exists in operation S20, and activating a protection circuit in operation S30. Embodiments of operation S10 will be described in with reference to operation S10A of FIG. 3 and operation S10B of FIG. 4.

In operation S10, the control unit 150 determines that a line open check is to be performed to determine if any of the plurality of connection lines L1, L2, L3, and L4 connected between the plurality of battery cells B1, B2, B3, B4, and B5 in the battery 110 are open. In some embodiments, the control unit 150 determines whether a line open check signal is received in operation S10A of FIG. 3. Operation S10A may, for example, be performed before shipment of the battery pack 100, and the line open check signal may be provided to the control unit 150 by an operator through the communication terminal 124. In some embodiments, the control unit 150 determines whether a current of the battery 110 is less than the reference current value for more than a predetermined time, as shown in the operation S10B of FIG. 4. Operation S10B may, for example, be performed after shipment of the battery pack 100, and a current flowing state of the battery 110 may be sensed using the sensor resistor 148 by the control unit 150.

In operation S20, the control unit 150 determines whether a line open condition of the plurality of connection lines L1, L2, L3, and L4 exists if the line open check condition of operation S10 is satisfied. In some embodiments, when the control unit 150 receives a line open check signal in the operation S10A of FIG. 3, or the control unit 150 determines whether a current of the battery 110 is less than a reference current value for more than a predetermined time in the operation S10B of FIG. 4, the control unit 150 determines whether a difference between the maximum value Vmax and the minimum value Vmin of voltages V1, V2, V3, V4, and V5 of the plurality of battery cells B1, B2, B3, B4, and B5 is greater than the reference voltage value.

In operation S30, if a line open condition of the plurality of connection lines L1, L2, L3, and L4 is detected, the control unit 150 opens the protection circuit unit 160. In some embodiments, the control unit 150 blows the fuse 161 using the heat resistor 162 and the control switch 163.

Next, a result of the line open detecting method of the battery 100 will be described with reference to tables 1 through 3. V1 refers to a voltage across the first battery cell B1. V2 refers to a voltage across the second battery cell B2. V3 refers to a voltage across the third battery cell B3. V4 refers to a voltage across the fourth battery cell B4. V5 refers to a voltage across the fifth battery cell B5. Vmax−Vmin refers to a difference between the maximum value and the minimum value of the voltages V1, V2, V3, V4, and V5.

TABLE 1

| voltage of battery cell | Simulation measurement value |
| --- | --- |
| V1 | 3.321 V |
| V2 | 3.474 V |
| V3 | 3.487 V |
| V4 | 3.704 V |
| V5 | 3.375 V |
| Vmax − Vmin | 0.383 V |

The Table 1 represents a result of the line open detecting method of the battery pack 100 when there is no line open in the plurality of connection lines L1, L2, L3, and L4 connected between the first battery cell B1 to the fifth battery cell B5. In the simulation result of the table 1, Vmax−Vmin is about 0.383 V, which is less than the reference voltage value (e.g., about 1 V).

TABLE 2

| voltage of battery cell | Simulation measurement value |
| --- | --- |
| V1 | 1.431 V |
| V2 | 5.319 V |
| V3 | 3.547 V |
| V4 | 3.709 V |
| V5 | 4.377 |
| Vmax − Vmin | 3.888 V |

The table 2 represents a result of the line open detecting method of the battery pack 100 when there is a line open in the connection lines L1, L2, L3, and L4 connected between the first battery cell B1 to the fifth battery cell B5. In the result of the table 2, Vmax−Vmin is about 3.888V, which is greater than the reference voltage value (e.g., about 1 V). Therefore, a line open of the first connection line L1 is detected according to the line open detecting method of the battery pack 100.

TABLE 3

| voltage of battery cell | Simulation measurement value |
| --- | --- |
| V1 | 3.332 V |
| V2 | 1.442 V |
| V3 | 5.316 V |
| V4 | 3.905 V |
| V5 | 4.374 V |
| Vmax − Vmin | 3.874 V |

The table 3 represents a result of the line open detecting method of the battery pack 100 when there is a line open condition in the second connection line L2. In the result of the table 2, Vmax−Vmin is about 3.874 V, which is greater than the reference voltage value (e.g., about 1 V). Therefore, a line open condition in the second connection line L2 is detected according to the line open detecting method of the battery pack 100.

Referring to the tables 1 through 3, the line open detecting method of the battery pack 100 according to some embodiments may detect a line open condition in the plurality of connection lines L1, L2, L3, and L4 connected between the first battery cell B1 to the fifth battery cell B5, by using Vmax−Vmin.

According to the battery pack and the line open detecting method thereof, since a line open condition in a plurality of connection lines connected to a plurality of batteries can be detected, defective battery packs can be discovered of before shipment. Furthermore, when a line open of the plurality of connection lines occurs after shipment, stability can be improved by stopping a charging and discharging operation.

Various embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made to the described embodiments.

What is claimed is:

1. A battery pack, comprising:
   a battery including a plurality of battery cells;
   a plurality of connection lines connected between the plurality of battery cells;
   a control unit configured to control a charging and discharging operation of the battery; and
   a protection circuit unit connected to the battery and to the control unit, wherein the control unit is configured to send a signal to open the protection circuit unit when a line open condition in a connection line is detected, wherein the protection circuit unit comprises a fuse connected between a positive terminal of the battery and a charging terminal of the battery pack, a heat resistor connected between the fuse and the control unit, and a control switch connected to the heat resistor and to the control unit;
   a voltage sensing and balancing circuit connected to the battery and to the control unit, wherein the voltage sensing and balancing circuit is configured to sense a voltage of the battery, and to control balancing of the battery; and
   an analog switch unit configured to determine a voltage of an additional battery cell, wherein the analog switch unit comprises a plurality of switches connected to a flying capacitor.

2. The battery pack as claimed in claim 1, further comprising:
   a pack discharging terminal connected to a positive terminal of the battery;
   a pack charging terminal connected to the positive terminal of the battery; and
   a pack negative terminal connected to a negative terminal of the battery,
   wherein the protection circuit unit is connected to the positive terminal of the battery and to the pack charging terminal.

3. The battery pack as claimed in claim 1, further comprising a communication terminal and a power terminal, which are connected to the control unit.

4. The battery pack as claimed in claim 1, wherein in response to receiving a line open check signal, the control unit determines a line open condition of the plurality of connection lines.

5. The battery pack as claimed in claim 1, wherein if the control unit senses that a current of the battery is less than a reference current value for more than a predetermined time, the control unit determines that a line open condition of the plurality of connection lines exists.

6. The battery pack as claimed in claim 1, wherein the voltage sensing and balancing circuit is configured to determine voltages of one or more of the battery cells.

7. The battery pack as claimed in claim 1, wherein the plurality of battery cells are connected in series or are connected in parallel.

8. The battery pack as claimed in claim 1, wherein the line open condition in the plurality of connection lines is detected when a difference between the maximum value and the minimum value of voltages of the plurality of battery cells is greater than a reference voltage value.

9. The battery pack as claimed in claim 1, wherein the analog switch unit charges a voltage of the additional battery cell.

10. A method of operating a battery pack, the method comprising:
    with a control unit, determining that a line open check is to be performed for a plurality of connection lines connected between a plurality of battery cells in a battery;
    if the line open check is to be performed, with the control unit, determining whether a line open condition in the plurality of connection lines exists;
    if a line open condition in the plurality of connection lines exists, in response to a signal from the control unit, opening a protection circuit unit connected to the battery, wherein the protection circuit unit comprises a fuse connected between a positive terminal of the battery and a charging terminal of the battery pack, a heat resistor connected between the fuse and the control unit, and a control switch connected to the heat resistor and to the control unit; and
    determining the voltages of the plurality of battery cells,
    wherein determining the voltages of the plurality of battery cells comprises operating a voltage sensing and balancing circuit unit to determine the voltages of one or more of the battery cells, and
    wherein determining the voltages of the plurality of battery cells further comprises operating an analog switch unit to determine the voltage of an additional battery cell, wherein the analog switch unit comprises a plurality of switches connected to a flying capacitor.

11. The method as claimed in claim 10, wherein determining that a line open check is to be performed comprises receiving a line open check signal.

12. The method as claimed in claim 10, wherein determining whether a line open condition in the plurality of connection lines exists comprises determining that a current of the battery is less than a reference current value for more than a predetermined time.

13. The method as claimed in claim 10, wherein determining whether a line open condition in the plurality of connection lines exists comprises determining that a difference between the maximum value and the minimum value of voltages of the plurality of battery cells is greater than a reference voltage value.

14. The method as claimed in claim 10, additionally comprising operating the analog switch unit to charge a voltage of the additional battery cell.

* * * * *